US007809357B2

(12) United States Patent
Hall et al.

(10) Patent No.: US 7,809,357 B2
(45) Date of Patent: Oct. 5, 2010

(54) SYSTEM AND METHOD FOR OPTIMIZING NETWORK COMMUNICATION IN RESPONSE TO NETWORK CONDITIONS

(75) Inventors: Gary William Hall, Redmond, WA (US); Zhidong Yang, Bellevue, WA (US); Omar Aftab, Redmond, WA (US); Yaroslav Goncharov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1287 days.

(21) Appl. No.: 11/134,671

(22) Filed: May 20, 2005

(65) Prior Publication Data

US 2006/0264203 A1 Nov. 23, 2006

(51) Int. Cl.
*H04M 1/725* (2006.01)
(52) U.S. Cl. .................. 455/412.2; 455/412.1; 455/466; 455/567; 709/206
(58) Field of Classification Search .............. 455/412.2, 455/574, 413, 567, 414.1, 412.1, 466; 370/252; 707/201, 621; 709/203–206
See application file for complete search history.

(56) References Cited

U.S. PATENT DOCUMENTS

| | | | | |
|---|---|---|---|---|
| 5,177,780 A * | 1/1993 | Kasper et al. ................ 455/413 |
| 5,337,044 A * | 8/1994 | Folger et al. ................. 340/7.1 |
| 5,509,000 A * | 4/1996 | Oberlander ................. 370/409 |
| 5,631,946 A * | 5/1997 | Campana et al. ......... 455/412.1 |
| 5,699,511 A | 12/1997 | Porcaro |
| 5,742,905 A * | 4/1998 | Pepe et al. ................... 455/461 |
| 5,905,777 A * | 5/1999 | Foladare et al. ........... 379/90.01 |
| 5,966,714 A * | 10/1999 | Huang et al. ................. 707/201 |
| 6,138,908 A * | 10/2000 | Moon et al. .................. 235/380 |
| 6,249,807 B1 * | 6/2001 | Shaw et al. .................. 709/206 |
| 6,259,892 B1 * | 7/2001 | Helferich ..................... 340/7.2 |
| 6,397,060 B1 * | 5/2002 | Oikawa ...................... 455/420 |
| 6,684,238 B1 * | 1/2004 | Dutta ......................... 709/206 |
| 6,701,378 B1 * | 3/2004 | Gilhuly et al. .............. 709/249 |
| 7,020,458 B2 * | 3/2006 | Bossemeyer et al. ...... 455/412.2 |
| 7,359,947 B2 * | 4/2008 | Kelley et al. ................ 709/206 |
| 7,437,169 B2 * | 10/2008 | Khoury et al. .............. 455/466 |
| 7,548,886 B2 * | 6/2009 | Kirkland et al. ............... 705/44 |
| 7,568,001 B2 * | 7/2009 | McPartlan et al. .......... 709/202 |
| 7,711,784 B2 * | 5/2010 | Kelley et al. ................ 709/206 |
| 2002/0055350 A1 * | 5/2002 | Gupte et al. ................ 455/412 |
| 2003/0013430 A1 * | 1/2003 | Skinner et al. ............. 455/412 |
| 2003/0157947 A1 * | 8/2003 | Fiatal et al. ................. 455/466 |
| 2004/0165543 A1 * | 8/2004 | Nakazawa .................. 370/252 |
| 2006/0079255 A1 * | 4/2006 | Bantukul et al. ............ 455/466 |
| 2006/0168028 A1 * | 7/2006 | Duxbury et al. ............ 709/206 |
| 2007/0143407 A1 * | 6/2007 | Avritch et al. .............. 709/206 |
| 2007/0293275 A1 * | 12/2007 | Kalinichenko et al. ...... 455/567 |
| 2009/0287818 A1 * | 11/2009 | Tachibana et al. ........... 709/224 |

* cited by examiner

*Primary Examiner*—Sharad Rampuria
(74) *Attorney, Agent, or Firm*—Merchant & Gould (57) ABSTRACT

A system and method for facilitating communications between a mobile device and a network application are provided. A mobile device transmits a request for data change information that includes a time out interval. The network application receives the request and measures a time elapsed since the receipt of the data change request. The network application transmits notification to the mobile device client that the time out interval has elapsed or a network specified time out occurs. As notifications are received or a network time out is detected, the mobile client device tunes the time out interval for subsequent data change requests.

20 Claims, 12 Drawing Sheets

SYSTEM AND METHOD FOR OPTIMIZING NETWORK COMMUNICATION IN RESPONSE TO NETWORK CONDITIONS

FIELD OF THE INVENTION

In general, the present invention relates to mobile devices, computer software and communication devices, and in particular, to a system and method for optimizing network communication in response to network conditions.

BACKGROUND OF THE INVENTION

Generally described, mobile devices, such as mobile telephones and hand-held devices, utilize communication networks to exchange data with other mobile devices and/or computer devices. In a typical embodiment, a mobile device can utilize a wireless communication network, and various network protocols, to transmit and receive data. In such an embodiment, a mobile device can maintain continuous, or semi-continuous, wireless connections to allow a user with a mobile device to receive and transmit electronic mail. As the computing device processing resources and wireless network communication bandwidth continue to increase, the use of wireless enabled mobile devices to receive/transmit electronic mail has substantially increased.

Figure 1:
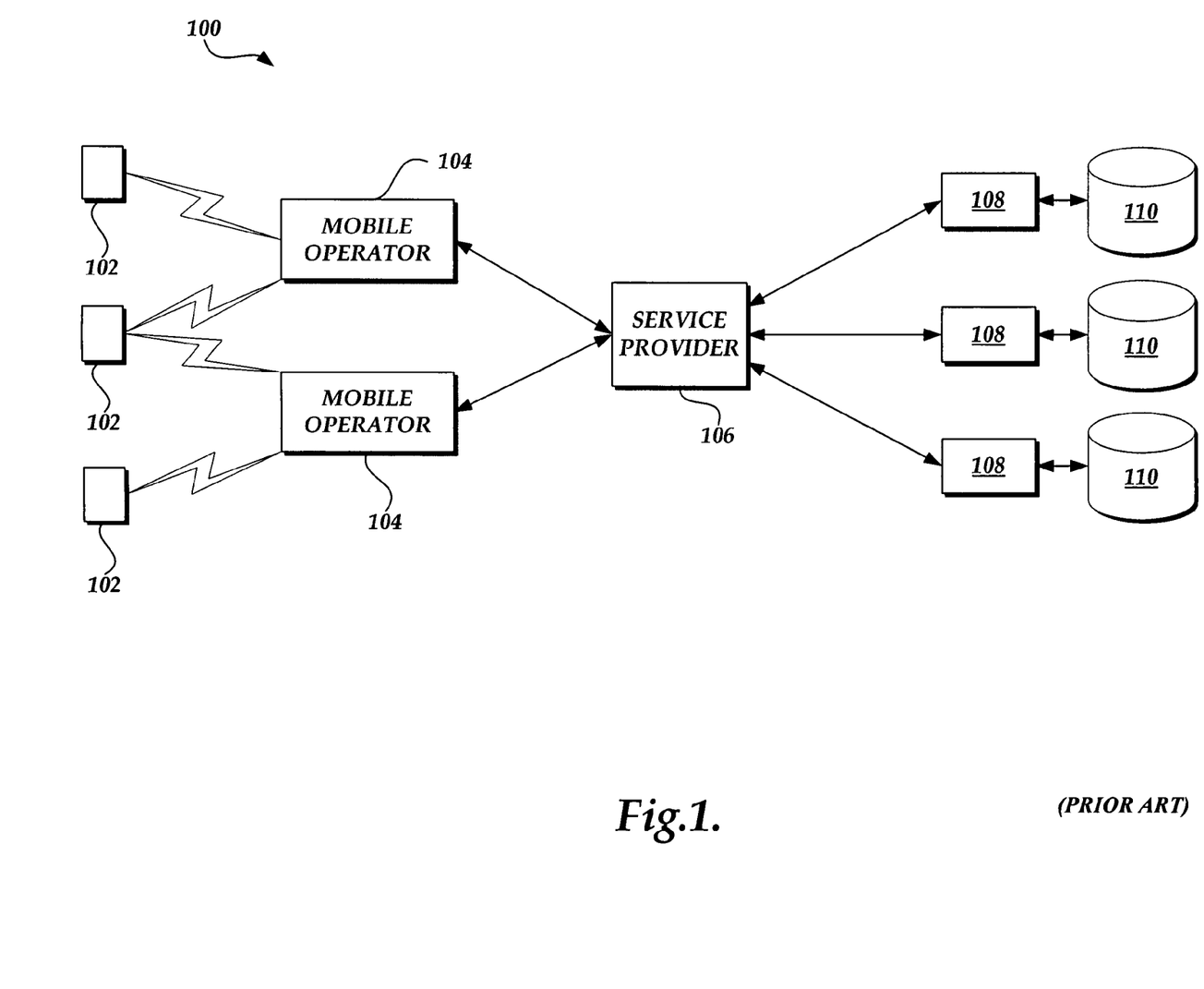
FIG. 1 is a block diagram of a system for facilitating the transmission of electronic mail data to a mobile device via a cellular communication network in accordance with a push data model.

FIG. 1 is a block diagram illustrative of a system 100 for facilitating the transmission of electronic mail data to a mobile device via a cellular communication network. The system 100 is generally referred to as a "push" data model, in which data, such as electronic mail messages, is transmitted to a client as the data is received. With reference to FIG. 1, the system 100 includes a plurality of clients 102, such as mobile telephones, hand-held devices, etc., that include some form of wireless (e.g., cellular) transmission capability. As illustrated in FIG. 1, each of the mobile devices 102 is in wireless communication with one of several mobile device operators 104. Generally described, a mobile device operator 104 is a service provider that maintains radio frequency-based communication with any number of mobile devices 102. The wireless communication between the mobile devices 102 and the mobile device operator 104, such as via a cellular communication network, is well known and will not be described in greater detail.

With continued reference to FIG. 1, each mobile device operator 104 is also in communication with a data service provider 106. A typical data service provider 106 can be a server computer configured to transmit messages corresponding to identified mobile users. As will be explained in greater detail below, the data service provider 106 monitors for incoming data (e.g., electronic mail messages) and pushes the data to a corresponding mobile operator 104 for transmission to a selected mobile device 102. The network connection between the data service provider 106 and the mobile operators 104 may be via a wireless communication network and/or a wired communication network. The data service provider 106 is also in communication with a number of electronic mail interface computing devices 108. The electronic mail interface computing devices 108 generally correspond to specially configured computing devices that serve as an interface between a local network mail repository 110 and the data service provider 106.

In practice, as updated information, such as a new electronic mail, is received at the network mail repository 110, the electronic mail interface computing device 108 obtains a copy of the mail and forwards a notification to the data service provider 106. The data service provider 106 processes the incoming message notifications and identifies the mobile device 102 that is to receive the mail. The data service provider 106 then forwards a notification and/or the mail to a corresponding mobile operator 104, which transmits the information to the selected mobile device 102.

In this approach, the mobile device 102 receives notifications/data as the data is received by the data service provider 106. Although this approach provides a real-time, or substantially real-time, transmission of data to a mobile device 102, it requires a number of specialized computing device applications and/or specialized business relationships. For example, in a typical embodiment, each local network is required to maintain an electronic mail interface computing device 108 to forward incoming message notifications to the data service provider 106. Additionally, the system 100 requires a centralized information collection and distribution center (e.g., data service provider 106), which typically charges a service fee to each mobile device user. Further, this approach requires the data service provider 106 to maintain appropriate communication interfaces, such as specialized software, and specialized business relationships, with a number of mobile operators to allow the data service provider to initiate contact with a selected mobile device 102.

Figure 2:
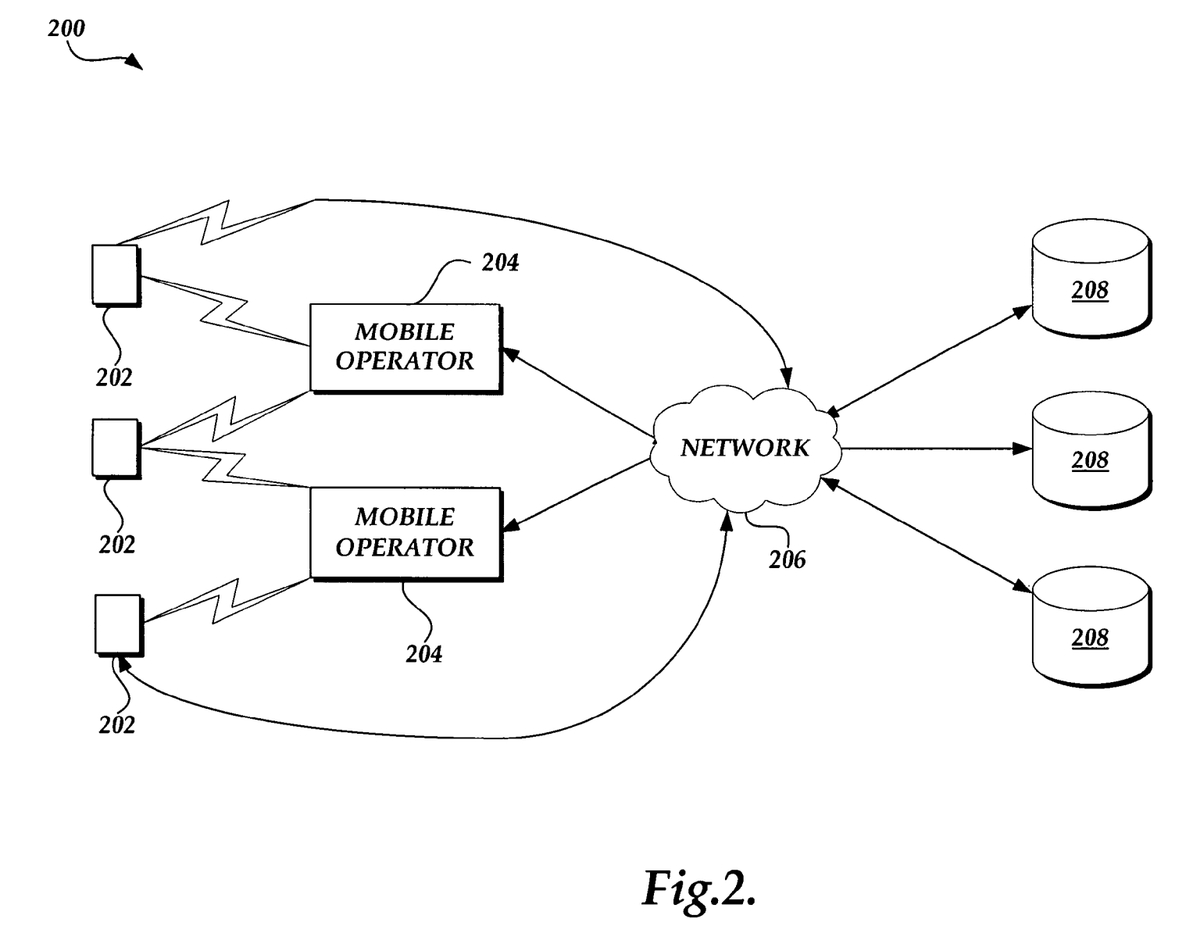
FIG. 2 is a block diagram of a system for facilitating the transmission of electronic mail to a mobile device via a cellular communication network in accordance with a pull data model.

FIG. 2 is a block diagram illustrative of an alternate system 200 for facilitating the transmission of electronic mail data to a mobile device via a cellular communication network. The system 200 is generally referred to as a "pull" data model, in which data, such as electronic mail messages, is transmitted to a client, such as a mobile device, in response to a request for new data by the client. Similar to system 100 (FIG. 1), the system 200 includes a plurality of mobile device clients 202, that have some form of wireless transmission capability (e.g., cellular communication capabilities). Each of the mobile devices 202 is in wireless communication with one of several mobile device operators 204. Alternatively, the mobile device 202 can also establish network communication via a short range wireless connection, such as defined in the IEEE 802.11 communication standard.

In both embodiments, the wireless communication link between the mobile device operator 204 and each mobile device 202 is not a specialized communication link for transmitting electronic mail messages. Instead, the communication link is a traditional data transmission communication link with a wide area network 206, such as the Internet. For example, in one common embodiment, a wireless enabled mobile device 202 can transmit data across the Internet in accordance with the Transmission Control Protocol (TCP)/Internet Protocol (IP) protocol. The mobile devices 202 utilize the network connection 206 to interface directly with the local electronic mail interface computing devices 208.

In practice, the mobile device 202 establishes a communication link with the electronic mail interface computing device 208, typically through a secure data transmission protocol. The mobile device 202 then transmits a request to receive any updated information (e.g., new electronic mail) directly to the electronic mail interface computing device 208. If there is new data for the mobile device user, the electronic mail interface computing device 208 generates an appropriate response that instructs the mobile device 102 to pull the data from the electronic mail interface computing device 208. If there is not new data, the electronic mail interface computing device 208 generates a negative response to the requesting mobile device 202. Once the mobile device request is processed, the communication link between the mobile device 202 and the electronic mail interface computing device 208 is terminated.

By allowing a direct communication channel between the mobile devices 202 and the electronic mail interface computing devices 208 over a network connection, the system 200 mitigates the need for specialized software/computing devices for each local network and at each mobile operator 204. However, conventional systems using a "pull" data model can become deficient in that incoming data may not be delivered contemporaneously as the data is received. Although this deficiency may be reduced by increasing the frequency in which the mobile devices 204 generate the above described data change requests, the typical methodology for establishing a communication link between a mobile device 204 and the electronic mail interface computing device 208 consumes power resources from the mobile device. For example, if a mobile device 204 does not have a good data connection to a mobile operator, repetitive requests for new data would unnecessarily consume the service's power resources.

Thus, there is a need for a system and method for facilitating communication between a computing device and a network application that delivers incoming data notifications contemporaneously as the data is received while balancing the mitigation of power resource consumption of the computing device.

SUMMARY OF THE INVENTION

A system and method for facilitating communications between a mobile device and a network application are provided. A mobile device transmits a request for data change information that includes a time out interval. The network application receives the request and measures a time elapsed since the receipt of the data change request. The network application transmits notification to the mobile device client that the time out interval has elapsed or a network specified time out occurs. As notifications are received or a network time out is detected, the mobile client device tunes the time out interval for subsequent data change requests.

In accordance with an aspect of the present invention, a method for facilitating communications between a mobile device and a network application is provided. In accordance with the method, a mobile device transmits a first request for change of data. The request for change of data includes a first time out interval for returning a response. The mobile device determines an event corresponding to the first request for change of data has occurred and generates a second time out interval for returning a response based upon the event corresponding to the first request for change of data. The mobile device generates the second time out interval for returning a response by adjusting the first time out interval based upon receipt of a no data change notification or detecting a network specified time out event. The mobile device then transmits a second request for change of data that includes the second time out interval for returning a response.

In accordance with another aspect of the present invention, a method for facilitating communications between a mobile device and a network application is provided. In accordance with the method, a mobile device transmits a first request for change of data that includes a first time out interval for returning a response. The mobile device determines that an event corresponding to the first request for change of data has occurred and associates a set of adjustment criteria to the event corresponding to the first request for change of data. The mobile device generates a second time out interval for returning a response by applying a time constant from the set of adjustment criteria. The mobile device then transmits a second request for change of data that includes the second time out interval for returning a response.

In accordance with a further aspect of the present invention, a computer-readable medium having computer-executable components for facilitating communications between a mobile device and a network application is provided. The computer-executable components include a communication component for transmitting data requests for change of data to the network application and for receiving events corresponding to previous requests for change data. The requests for change of data include a time out interval for providing a response. The computer-executable components also include a processing component for generating time out intervals for returning a response based upon the event corresponding to previous requests for change of data. The processing component generates the time out intervals for returning a response by applying a set of adjustment criteria to the events corresponding to previous requests for change of data received by the communication component.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for optimizing communication between a client device and a network application. More specifically, the present invention is directed toward a system and method for optimizing communication between a mobile device and a network application via a wireless network. The present invention will be described with regard to an architecture incorporating a pull data model in which the mobile device requests data change information in the form of electronic mail messages from a network application. Further, the present invention will be described with regard to the utilization of a time out interval to maintain a communication link between a mobile device and a network application. Although the present invention will be described with regard to a mobile devices, wireless communication networks, and/or electronic mail transmissions, one skilled in the relevant art will appreciate that the disclosed embodiments are illustrative in nature and should not be construed as limiting.

In an illustrative embodiment of the present invention, a system implementing a pull data model, such as system 200 (FIG. 2), may be utilized to facilitate the transmission of information between a client, such as a mobile device 202, and a network application, such as an electronic mail interface computing device 208. The mobile device 202 and the electronic mail interface computing device 208 transmit information via a typical network data connection 206, such as the Internet. The connection from the network 206 to the mobile device 202 may be facilitated through a mobile device operator 204 (e.g., a data connection via a wireless communication link) or via a direct wireless connection to the network (e.g., a Bluetooth protocol wireless connection).

In accordance with the present invention, a mobile device issues a data change request to the electronic mail interface computing device 208. The data change request can include a registration request for new data that has arrived at the electronic mail interface computer device 208 (e.g., a new email message) and a time-out interval. The time-out interval specifies a time in which the electronic mail interface computing device 208 is required to provide a positive or negative response to the registration request for new data. Unlike traditional data change requests, the electronic mail interface computing device 208 does not provide an immediate response to the data change request if no new data is available. Instead, the electronic mail interface computing device 208 maintains a communication link with the mobile device 202 until it detects an information change (e.g., the arrival of new electronic mail) or the expiration of the time out interval. Upon occurrence of either event, the electronic mail interface computing device 208 transmits an appropriate response to the mobile device 202. In turn, the mobile device 202 can update the time-out interval according to various network conditions and sends a subsequent data change request with the updated time out interval. The ability to update the time out interval to various network condition transistions facilitates power resource consumption maintenance.

Figure 3A:
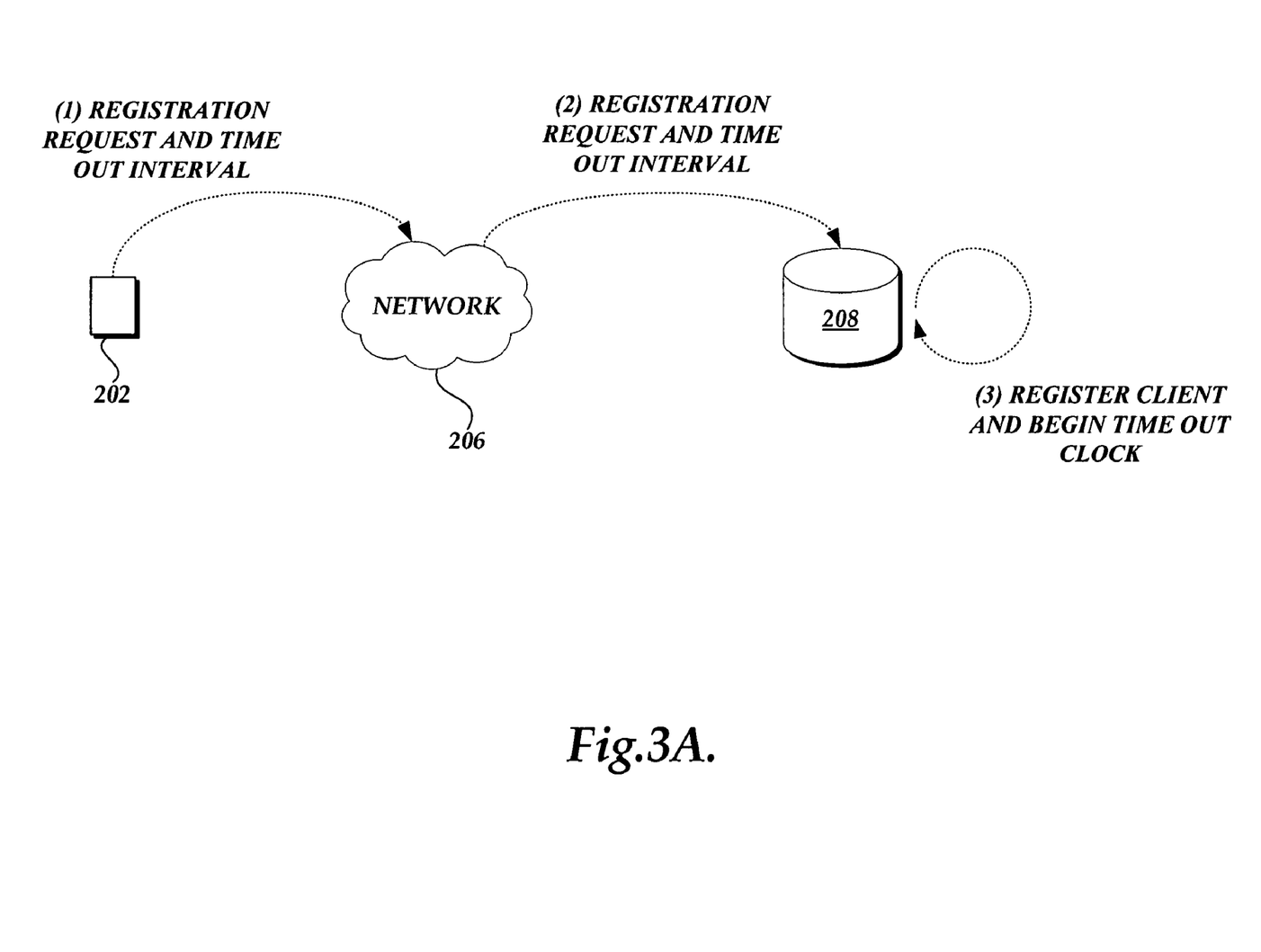
FIG. 3A is a block diagram of the system of FIG. 2 illustrating the generation of a data change request by a mobile device including a time out interval in accordance with an aspect of the present invention.

With reference now to FIGS. 3A-3D, various embodiments for processing a client request having a time out interval in accordance with the present invention will be described. With reference to FIG. 3A, the process is initiated by the generation of a registration request and time out interval by a client on a mobile device. In an illustrative embodiment of the present invention, the registration request can include the registration of the type of information the client wishes to receive and various configuration information, such as notification preferences, client authentication information, and the like. As will be described in greater detail below, the time out interval may be in the form of a fixed time period or as a set of criteria that allows for the calculation of a time out interval. The time out interval may be a default period set by the mobile device client application, the mobile device operator 204 and the electronic mail interface computing device 208.

In a typical embodiment, a mobile device operator 204 may maintain a communication network time out interval that will result in a dropped communication link if no data is transmitted to/from the mobile device 202. The network specified time-out may depend on various network communication equipment (e.g., switches, etc.) and can vary along different parts of the communication network. Further, the network specified time out may vary depending on a time of day and/or network load. Oftentimes, the network-specified time out may not be known to the mobile device 202 or may change. Accordingly, in accordance with an aspect of the present invention, when the communication link with the network is considered "good," the mobile device 202 can discover the most current network specified time out interval by adjusting the mobile device specified time out interval to reach the network specified time out interval. In accordance with another aspect of the present invention, when the communication link with the network is considered "poor," the mobile device 202 can attempt to minimize the time out interval to more readily address communication failures. The registration request and time out interval is transmitted over the network 206 and is received by the electronic mail interface computing device 208 or a specialized application on the electronic mail interface computing device 208.

Upon processing the registration request, the electronic mail interface computing device 208 registers the mobile device client for receipt of all requested information, as authorized. As described above, if no new data is currently available for the registered client, the electronic mail interface computing device 208 does not automatically transmit a negative response to the mobile device 202. However, because the data change request remains pending and the communication link is not immediately terminated.

Figure 3B:
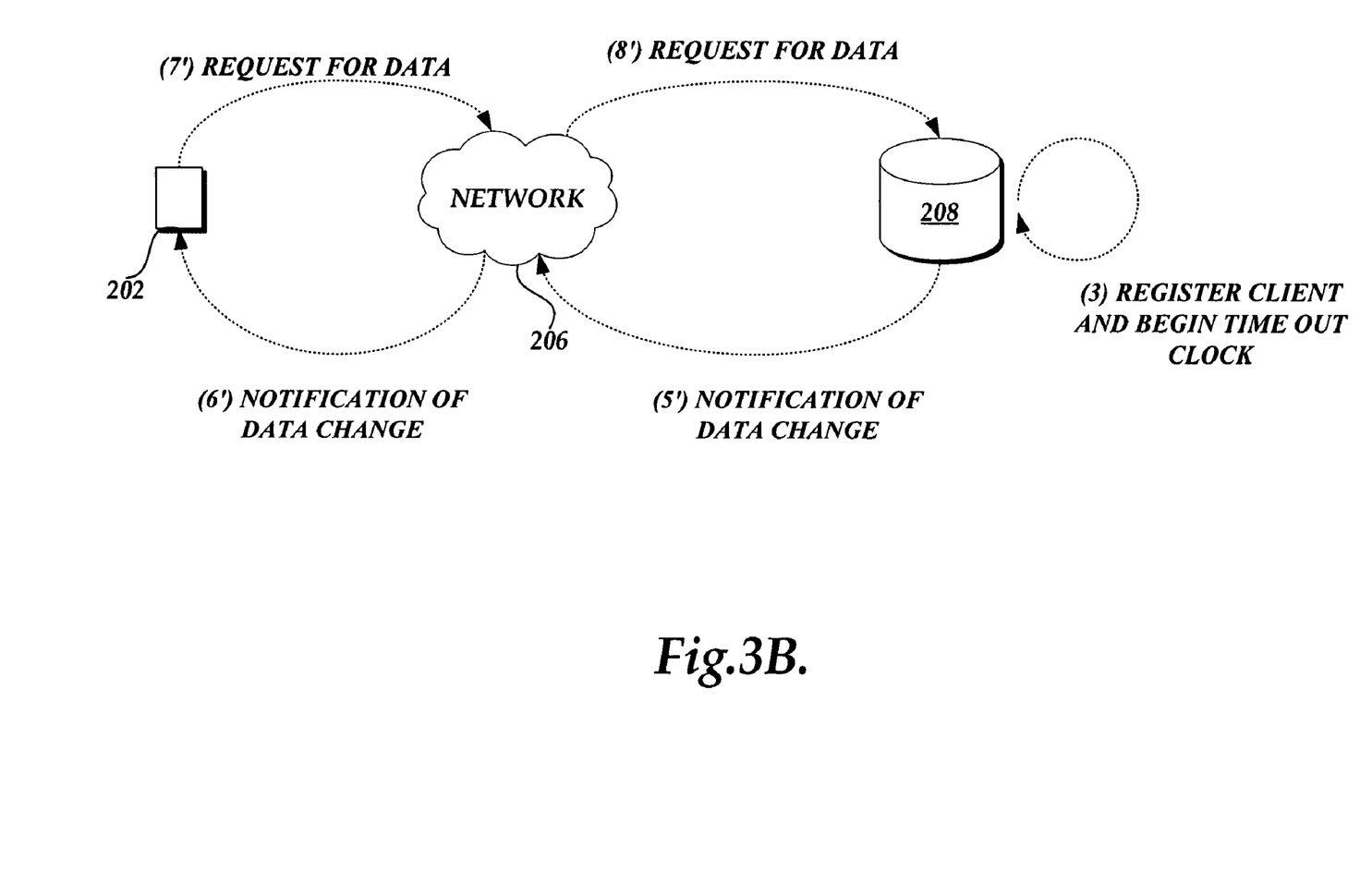
FIG. 3B is a block diagram of the system of FIG. 2 illustrating the transmission of a notification of a data change by a network application in accordance with an aspect of the present invention.

With reference now to FIG. 3B, in one embodiment, the electronic mail interface computing device 208 receives a notification that a data change has occurred that needs to be passed to the mobile device 202. In an illustrative embodiment of the present invention, the notification can include a notification from an electronic mail repository, such as an electronic mail server/client, that a user corresponding to the mobile device 202 has received a new electronic mail. The electronic mail interface computing device 208 transmits a notification to the mobile device 202, via the network 206, that the new data is available. In an illustrative embodiment of the present invention, the notification can include descriptive information or other criteria that may be used by the user and/or mobile device to decide whether the data will be retrieved. If the data is to be retrieved, the mobile device 202 transmits a request for data retrieval to the electronic mail interface computing device 208 in accordance with traditional and well-known data protocols, such as the Hypertext Transfer Protocol ("HTTP"), which will not be explained in greater detail. Once the data has been retrieved, the process illustrated in FIG. 3A can be repeated by the transmission of a new data registration request and time out interval by the mobile device 202.

Figure 3C:
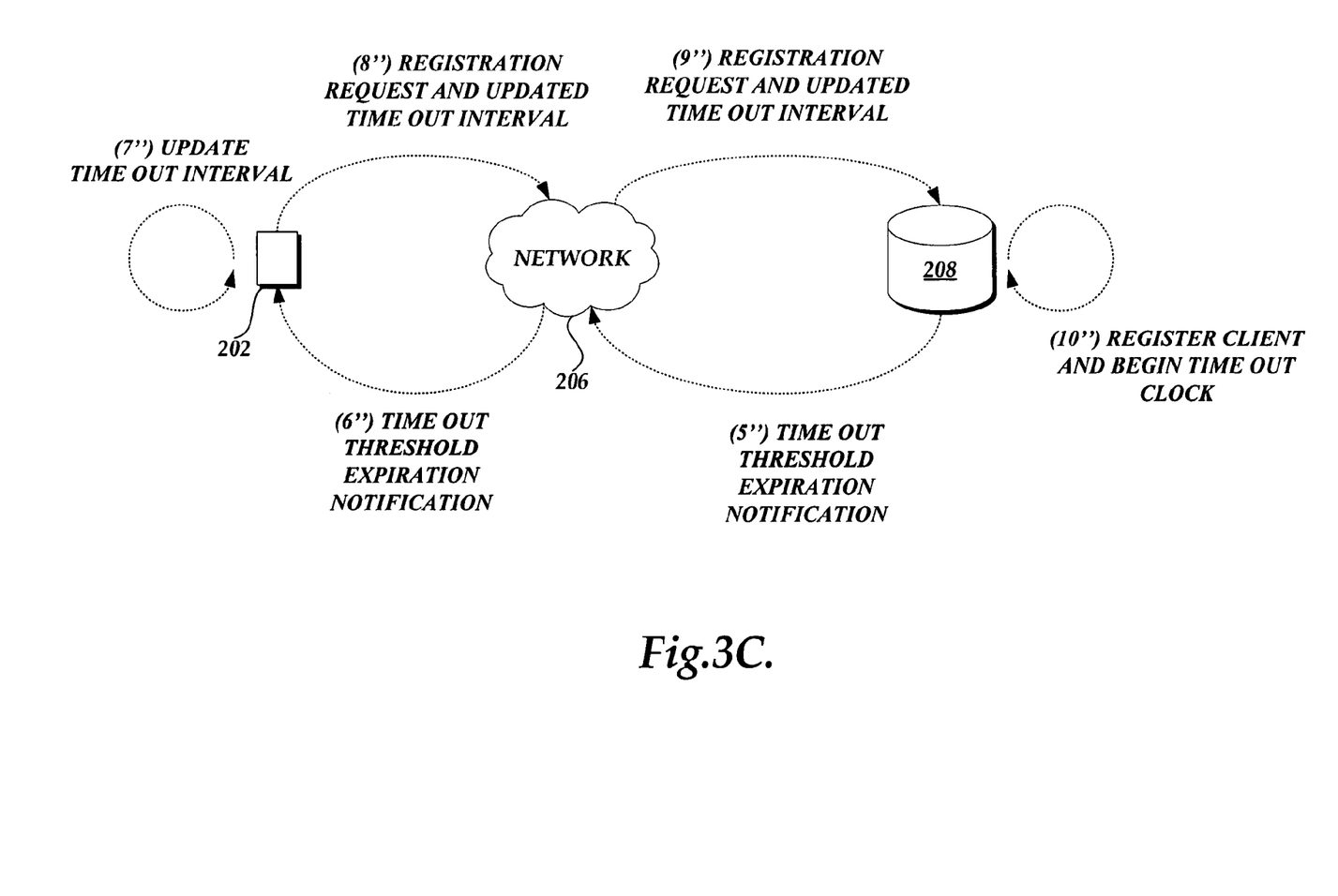
FIG. 3C is a block diagram of the system of FIG. 2 illustrating the transmission of a time out interval expiration notification by a network application in accordance with an aspect of the present invention.

With reference now to FIG. 3C, in another embodiment, the electronic mail interface computing device 208 continues to monitor the elapsed period time since the last communication for each registered mobile device client. If the electronic mail interface computing device 208 detects that the time out interval for registered client has expired, it transmits a notification to the mobile device 202 that the time out interval has expired and no new data notifications have been received. By transmitting the time out interval expiration notification, the electronic mail interface computing device 208 prevents the communication link with the mobile device 202 from being terminated, or dropped, by the mobile device operator 204.

As will be explained in greater detail below, upon receipt of the time out interval expiration notification, the mobile device 202 may update the previous time out interval. In an illustrative embodiment of the present invention, the mobile device 202 updates the time out interval by measuring or observing one of a variety of network conditions. The mobile device 202 then determines whether the time out interval should be adjusted based upon the measured, or observed, network conditions and/or a history of previously observed network conditions. Upon tuning, or adjusting, the time out interval, the mobile device 202 transmits a new registration request with the updated time out interval via the network 206. The electronic mail interface computing device 208 obtains the new request and repeats the registration process and time out clock measurement with the updated time out interval.

Figure 3D:
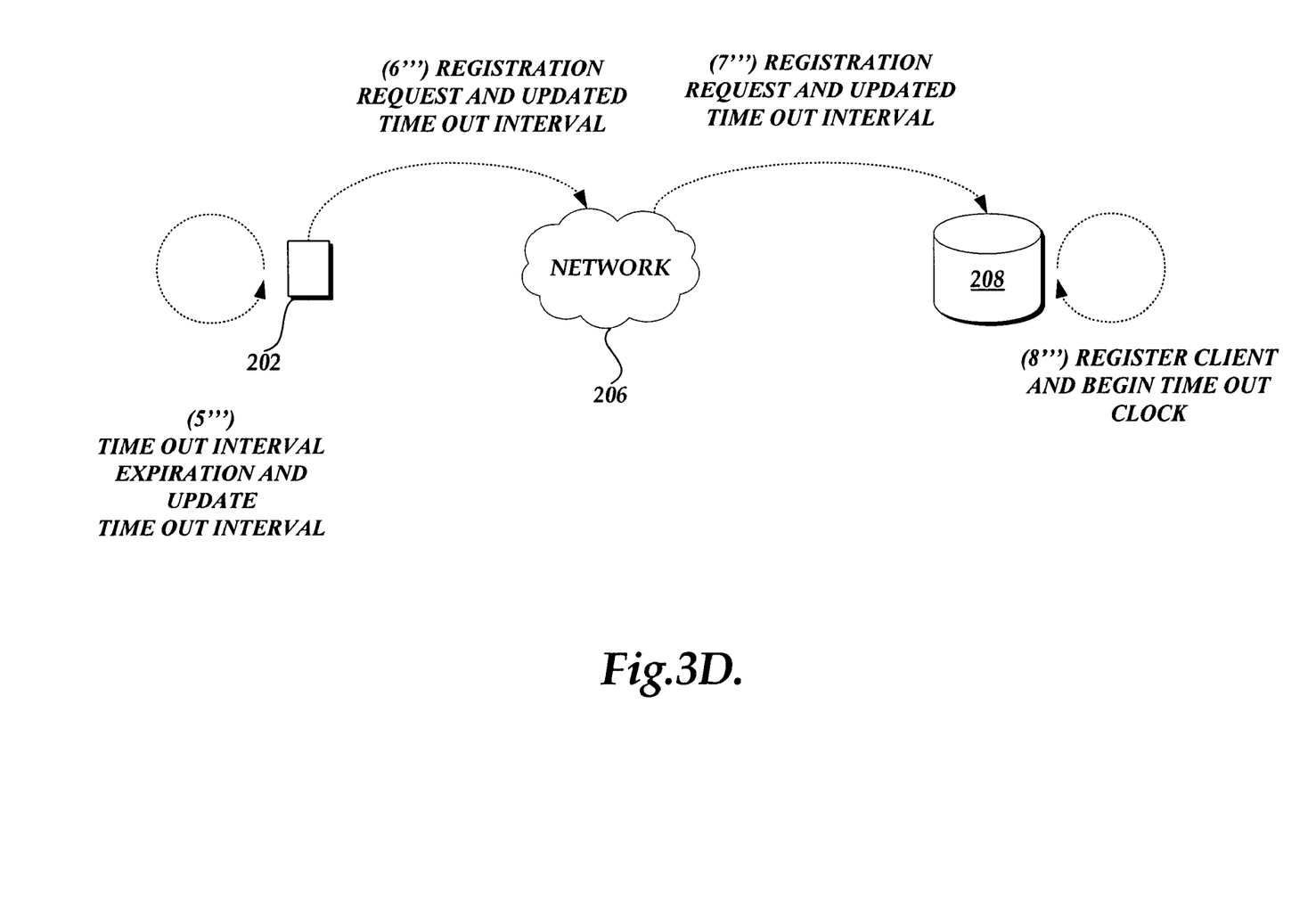
FIG. 3D is a block diagram of the system of FIG. 2 illustrating the processing of a time out interval expiration by a mobile device in accordance with an aspect of the present invention.

With reference now to FIG. 3D, in further embodiment, the mobile device 202 also monitors the time expired since the transmission of the previous registration request. If the mobile device 202 detects the expiration of the time out interval and it has not received a no new data notification from the electronic mail interface computing device 208, it assumes that communication link has been unexpectedly terminated (e.g., a network error) or otherwise terminated (e.g., a network time out based upon the expiration of a network time out interval). In one embodiment, the mobile device 202 updates the time out interval and transmits a registration request with the updated time out interval via the network 206 if the termination is based upon a communication network time out. The electronic mail interface computing device 208 obtains the new request and repeats the registration process and time out clock measurement with the updated time out interval. As described above, the mobile device 202 would also monitor the updated time out interval associated with the new request. In another embodiment, the mobile device 202 attempts to retry the communication if the termination is not based upon a communication network time out.

Figure 4:
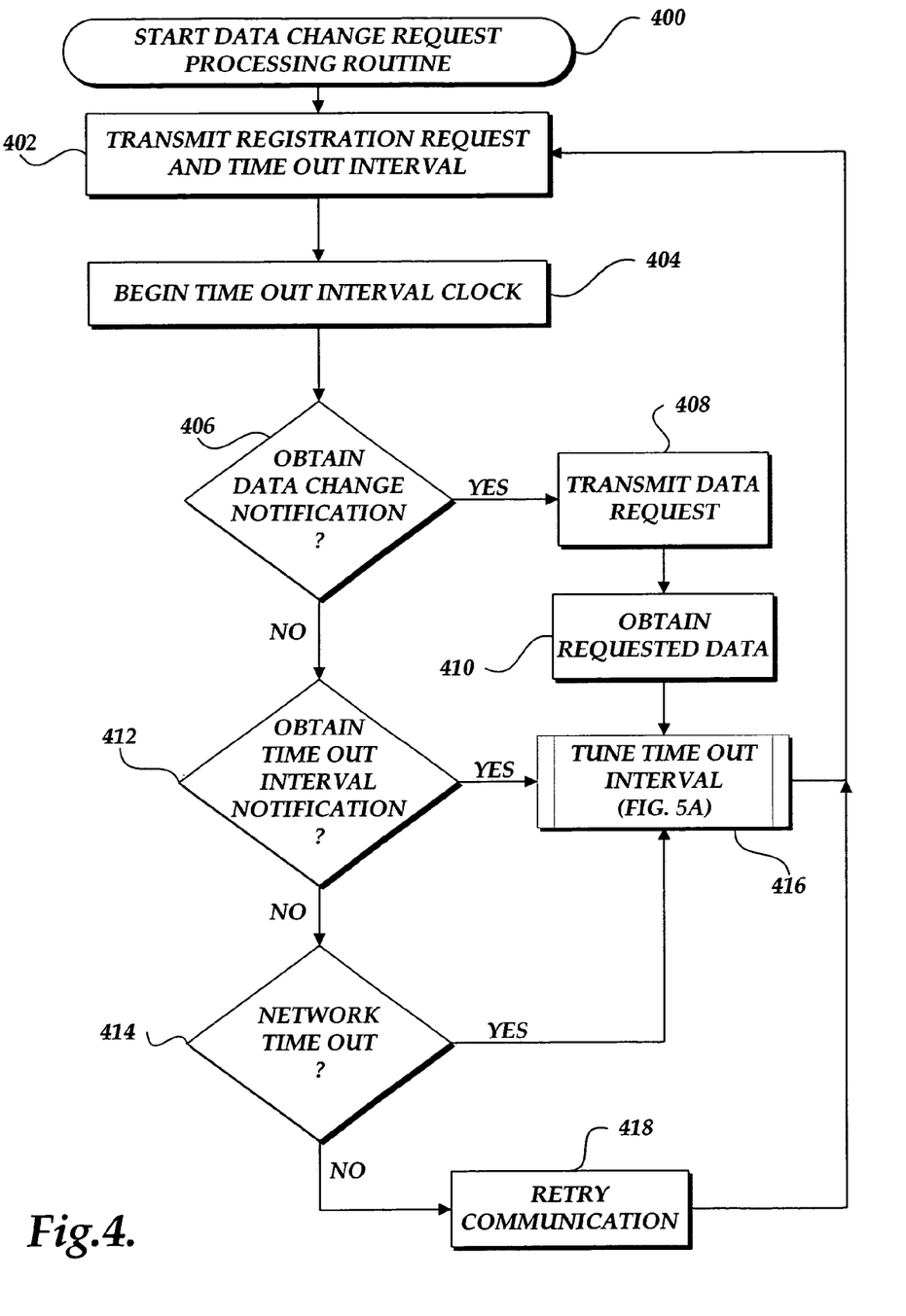
FIG. 4 is a flow diagram illustrative of a data change request transmission and monitoring routine implemented by a mobile device client in accordance with an aspect of the present invention.

With reference to FIG. 4, a flow diagram illustrative of a routine 400 implemented by a mobile device 202 to transmit and monitor a data change request to an electronic mail interface computing device 208 in accordance with the present invention will be described. At block 402, the mobile device transmits a registration request and time out interval to the electronic mail interface computing device 208. In an illustrative embodiment of the present invention, the registration request may correspond to a selection of one or more data types, specific data files, or application programs that the mobile device may wish to receive updated information from. For example, a registration may indicate that a user wishes to receive notification when new electronic mail is received or when a particular document has been updated. The registration request may also correspond to criteria, such as rules or keywords, for selecting which data to transmit to the mobile device. The registration request can also include credentials, or other authentication information, that may be needed to receive updated information.

In accordance with an illustrative embodiment of the present invention, the time out interval information may include the specification of a fixed expiration period or length of time to be added to a current time of day. Alternatively, the time out interval information may be specified in terms of selective criteria that facilitates the generation of a time out period, or expiration period. At block 404, the mobile device 202 begins a time out clock that measures the time expired from the transmission of the registration request by mobile device 202 or the receipt of the registration request by the electronic mail interface computing device 208. The time expired can be measured in any one of a variety of manners.

At decision block 406, a test is conducted to determine whether the mobile device 202 has received a data change notification from the electronic mail interface computing device 208. If the mobile device 202 has received the data notification, at block 408, the mobile device transmits a data request to the electronic mail interface computing device 208. In an illustrative embodiment of the present invention, the data request corresponds to a request for the actual data from the electronic mail interface computing device 208, such as an HTTP data request. At block 410, the mobile device 202 obtains the requested data from the electronic mail interface computing device 208. The routine 400 then proceeds to block 416 to tune the previously provided time out interval, which will be explained in greater detail below. Alternatively, the routine 400 may proceed return to block 402 to transmit a new data registration request without tuning the time out interval.

Returning to decision block 406, if the mobile device 202 has not received a data change notification from the electronic mail interface computing device 208, at decision block 412, a test is conducted to determine whether the mobile device has received a time out interval expiration notification from the electronic mail interface computing device 208. If a time out interval expiration notification has been received, the routine 400 proceeds to block 416, which will be explained in greater detail below.

Returning to decision block 412, if the mobile device has not received a time out interval expiration notification from the electronic mail interface computing device 208, at decision block 414, a test is conducted to determine whether a network time out error has been detected. As described above, at block 404, the mobile device measures a time expired since the transmission of the registration request. If the mobile device 202 detects that the time out interval has expired, it can assume that the electronic mail interface computing device 208 has failed to transmit a time out interval expiration notification and/or that the communication link with the electronic mail interface computing device 208 has expired. In an illustrative embodiment of the present invention, the mobile device 202 can characterize the expiration of the time out interval as either a network-based time out interval or as a communication network failure (e.g., dropped called).

Figure 5A:
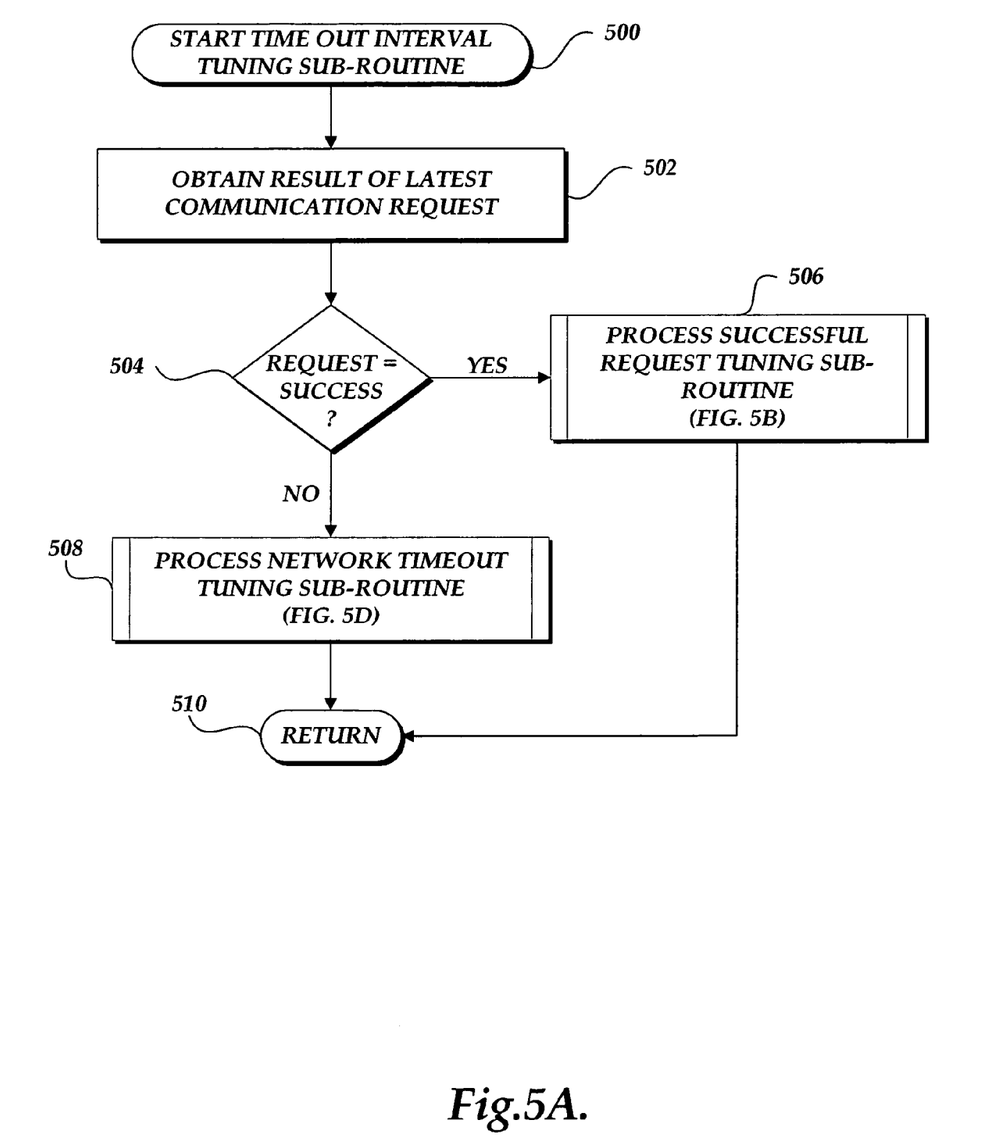
FIG. 5A is flow diagram illustrative of time out interval tuning sub-routine implemented by a mobile device client in accordance with an aspect of the present invention.

If the mobile device 202 determines that the failure to receive a data change notification and/or time out interval notification was based on a network time out, the routine 400 then proceeds to block 416 to tune the previously provided time out interval. Block 416 will be explained in greater detail with regard to sub-routine 500 (FIG. 5). Once the time out interval has been tuned, the routine 400 returns to block 402, where the mobile device transmits a new registration request with the tuned time out interval. Alternatively, if the mobile device 202 determines that the failure to receive a data change notification and/or time out interval notification was based was not based on a network time out, the mobile device 202 enters a retry communication mode in which it attempts to reestablish communications with the communication network. The routine 400 can then return to block 402.

With reference now to FIG. 5, an illustrative sub-routine 500 implemented by the mobile device 202 for tuning the time out interval, corresponding to block 416 (FIG. 4) will be described. In an illustrative embodiment of the present invention, the tuning of the time out interval corresponds to a determination of network communication strength based upon an investigation of network communication events (e.g., consecutive tuning events). In turn, the time out interval is adjusted in accordance with the detected communication quality. Turning to sub-routine 500, at block 502, the mobile device 202 obtains the result of the latest communication request. For purposes of tuning the time out interval, the result of the latest communication request can include receipt of a data change notification, receipt of a time out interval expiration notification, or detection of a communication network time out.

At decision block 504, a test is conducted to determine whether the latest communication result was successful. In an illustrative embodiment of the present invention, a successful communication result includes receipt of a time out interval notification from the electronic mail interface computing device 208. Additionally, the receipt of a data change notification may also be considered a successful communication. If the communication result was successful, the sub-routine 500 proceeds to block 506 to tune the time out interval according to a successful communication request. Block 506 will be described in greater detail with regard to FIGS. 5B and 5C. If the communication result was not successful (e.g., a network time out was detected), the sub-routine 500 proceeds to block 508 to tune the time out interval according to expiration of the network time out. Block 508 will be described in greater detail with regard to FIG. 5D. Upon the completion of either tuning sub-routine 506, 508, the sub-routine 500 returns at block 510.

Figure 5B:
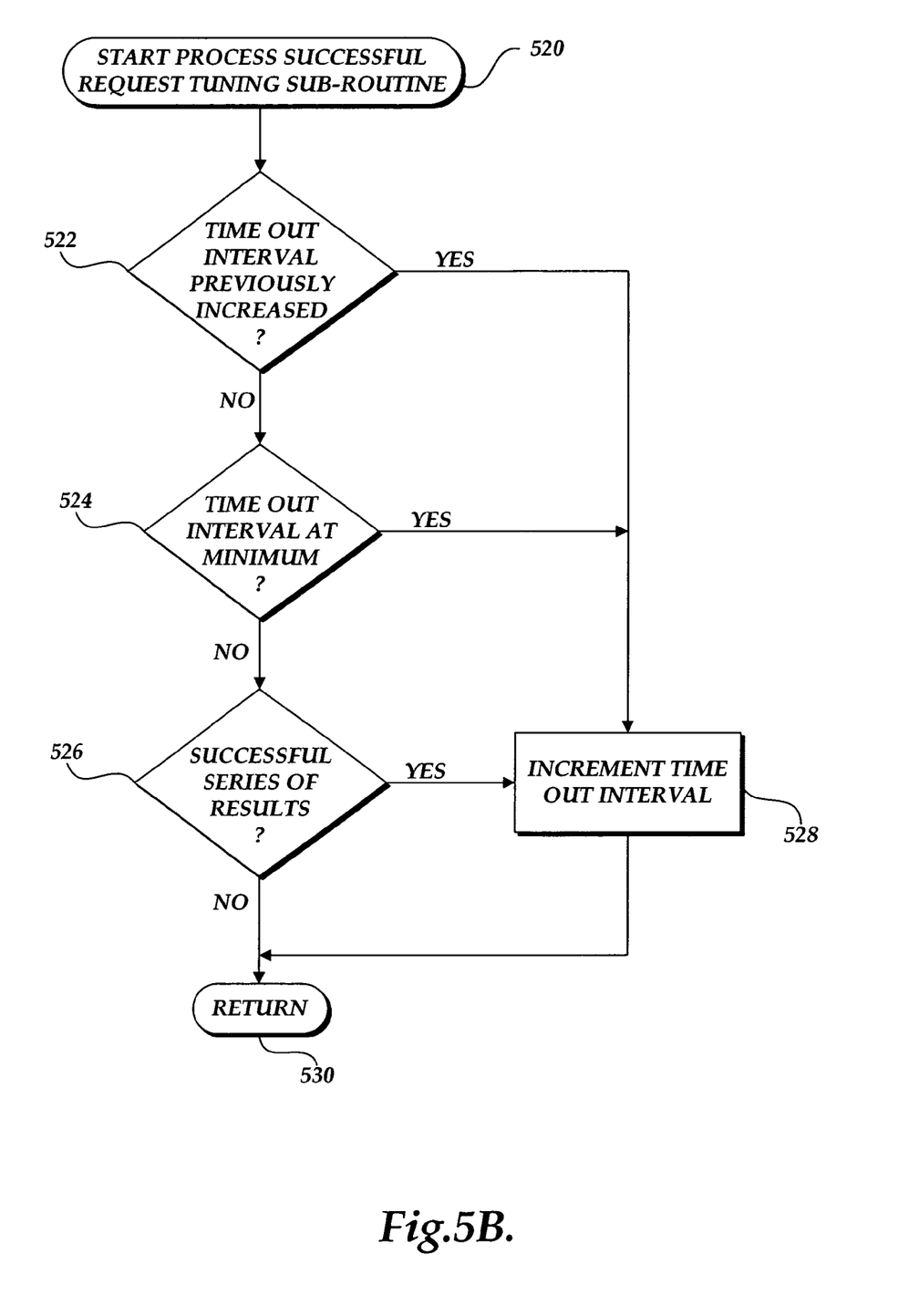
FIG. 5B is flow diagram illustrative of successful request tuning sub-routine implemented by a mobile device client in accordance with an aspect of the present invention.

With reference now to FIG. 5B, a sub-routine 520 for tuning the time out interval based upon receipt of a successful communication request will be described. In accordance with an illustrative embodiment of the present invention, the sub-routine 520 tunes the time out interval by determining whether specific criteria indicative of good communication with the network have occurred. One skilled in the relevant art will appreciate that the criteria applied can attempt to identify different communication scenarios, such as continued good coverage, transition from bad coverage to good coverage, or approaching the network specified time out interval. At decision block 522, a test is conducted to determine whether the time out interval was incremented during the previous iteration of sub-routine 500. If the time out interval was previously incremented, the sub-routine proceeds to block 528, which will be described in greater detail below. If the time out interval was not previously incremented in the previous iteration of sub-routine 500, at decision block 524, a test is conducted to determine whether the time out interval is set at a minimum. If the time out interval is set at a minimum, the sub-routine proceeds to block 528, which will be described in greater detail below. If the time out interval is not at a minimum, at decision block 526, a test is conducted to determine whether the mobile device 202 has completed a series of successful communications. In an illustrative embodiment of the present invention, a successful communication may correspond to the transmission of a registration request and receipt of a no data change notification. Receipt of a new data communication may not necessarily be considered a successful communication. For example, the mobile device 202 may test for five consecutive no data change notifications. Additionally, at decision block 526, the mobile device 202 can utilize additional external criteria, such as a determination of signal strength on the mobile device. If a series of successful communication requests has been received, the sub-routine proceeds to block 528, which will be described in greater detail below. Alternatively, the sub-routine 520 returns at block 530 without incrementing the time out interval.

With continued reference to FIG. 5B, if any of the criteria corresponding to decision blocks 522, 524, or 526 are satisfied, at block 528, the mobile device 202 increments the time out interval. In an illustrative embodiment of the present invention, the mobile device 202 increments the time out interval by a fixed constant. The fixed constant can be selected that allows for faster growth from the minimum time out interval, while attempting to edge closer to the network time out interval during successive good communication.

Figure 5C:
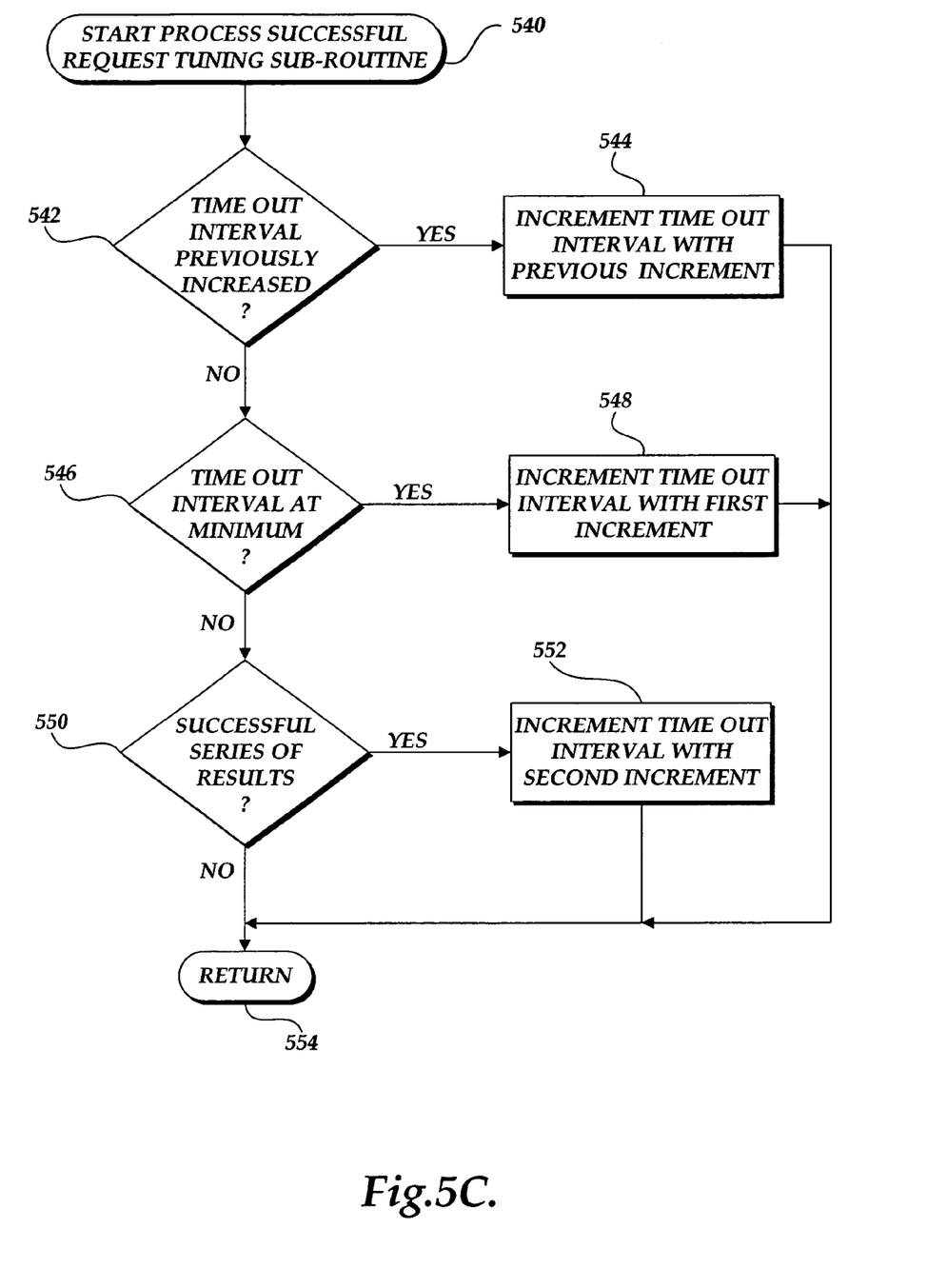
FIG. 5C is flow diagram illustrative of an alternative successful request tuning sub-routine implemented by a mobile device client in accordance with an aspect of the present invention.

With reference now to FIG. 5C, in an alternative embodiment of the present invention, sub-routine 540 may be utilized selectively tune the time out interval, corresponding to block 416 (FIG. 4). In this alternate embodiment, the satisfaction of each criterion possibly results in the use of a different constant for incrementing the time out interval. At decision block 542, a test is conducted to determine whether the time out interval was incremented during the previous iteration of sub-routine 500. If the time out interval was previously incremented, at block 546, the mobile device 202 increments the time out interval with the constant previously utilized during the previous iteration of sub-routine 500.

If the time out interval was not previously incremented in the previous iteration of sub-routine 500, at decision block 546, a test is conducted to determine whether the time out interval is set at a minimum. If the time out interval is set at a minimum, the mobile device 202 increments the time out interval with a first constant. In an illustrative embodiment of the present invention, the first constant is selected to allow the time out interval to grow at a faster pace from the minimum time out interval, which is more draining on the mobile device's power resources. Additionally, in an alternative embodiment of the present invention, the first constant may be selected to automatically allow the time out interval to be set at the highest historically achieved time out interval. The historical data may be maintained for each particular device and/or each particular network.

If the time out interval is not at a minimum, at decision block 550, a test is conducted to determine whether the mobile device 202 has completed a series of successful communications. As described above, a successful communication may correspond to the transmission of a registration request and receipt of a no data change notification. If a series of successful communication requests has been received, the mobile device 202 increments the time out interval with a second constant. In an illustrative embodiment of the present invention, the second constant is selected to allow the time out interval to approach the network time out interval without jumping above the network time out interval to quickly. Similar to decision block 546, in an alternative embodiment, the second constant may be selected to automatically allow the time out interval to be set at the highest historically achieved time out interval after a successful number of successful communication requests. Once the time out interval has been incremented at either blocks 544, 548, or 522 or if the mobile device has not detected the series of successful communications, the sub-routine 540 returns at block 554.

Figure 5D:
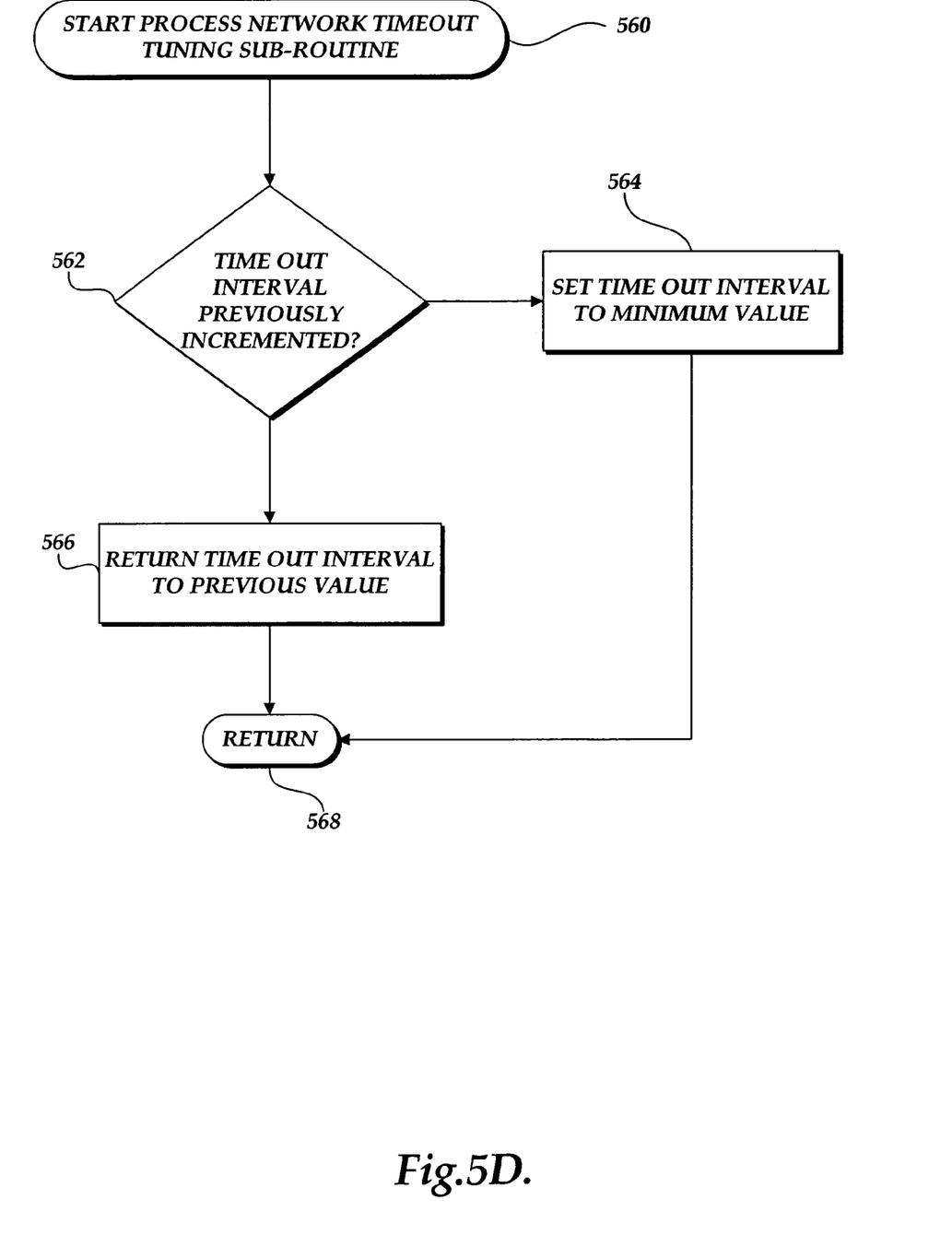
FIG. 5D is flow diagram illustrative of network time out tuning sub-routine implemented by a mobile device client in accordance with an aspect of the present invention.

With reference now to FIG. 5D, a sub-routine 560 for tuning the time out interval according to the expiration of the network time out, corresponding to block 508 (FIG. 5A) will be described. At decision block 562, a test is conducted to determine whether the time out interval was incremented in the previous iteration of sub-routine 500. If the time out interval was not previously incremented, at block 564, the mobile device 202 sets the time out interval to a minimum value. In an illustrative embodiment of the present invention, the mobile device 202 sets the time out to the minimum to address a transition to poor cellular coverage. Alternatively, if the time out interval was previously incremented, at block 566, the mobile device 202 returns the time out interval to its previous value. In an illustrative embodiment of the present invention, the mobile device 202 returns the time out interval to the previous value approach the network specified time out interval. In an alternate embodiment, the mobile device 202 may set the time out interval at block 566 to the highest historically achieved time out interval. Further, if the mobile device 202 has attempt to go above the highest historically achieved time out interval multiple times, the time out interval may be locked or fixed to the highest historically achieved time out interval after a series of unsuccessful attempts. At block 568, the sub-routine 560 returns.

Figure 6:
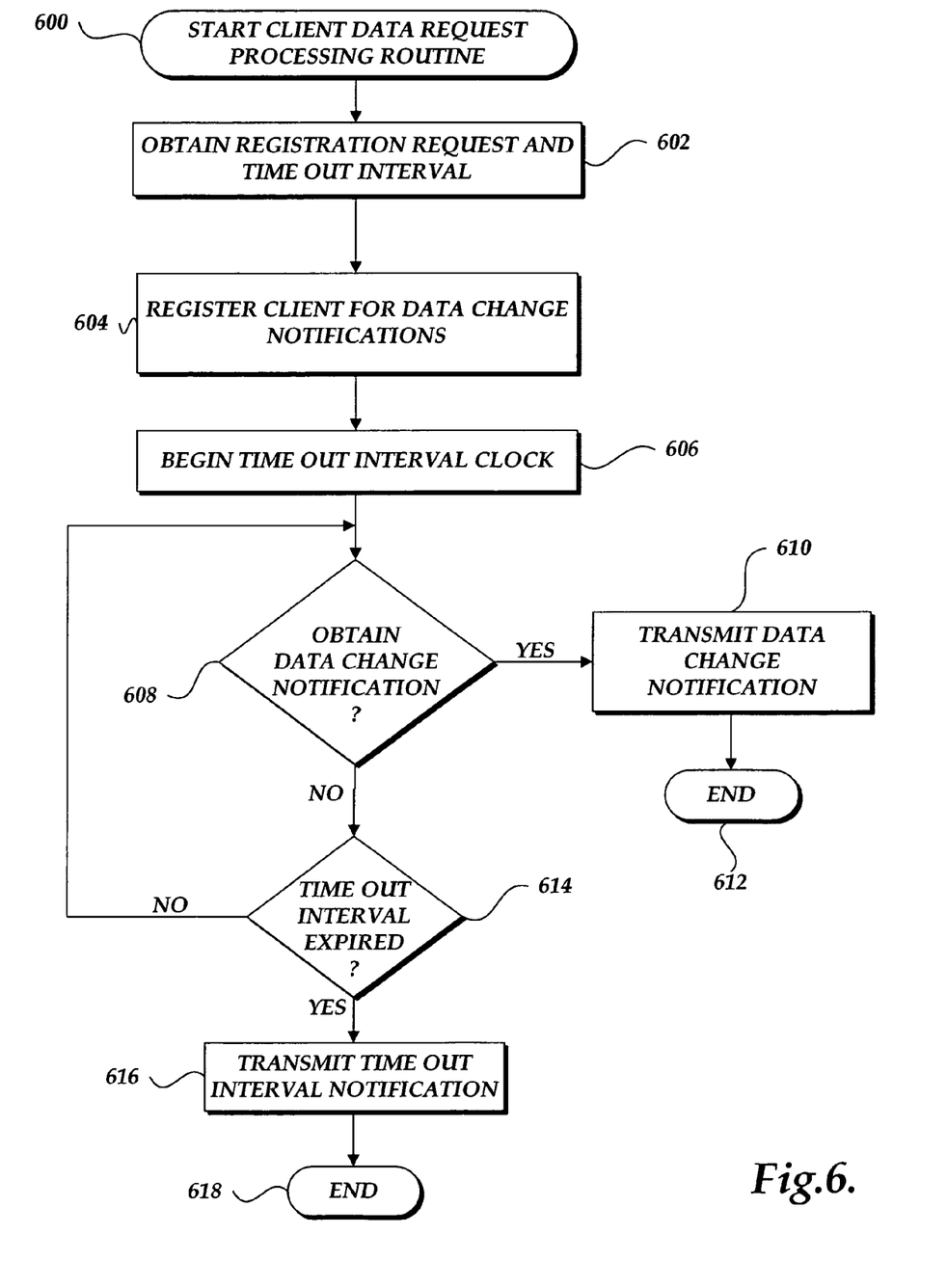
FIG. 6 is a flow diagram illustrative of client data change request processing routine implemented by a network application in accordance with the present invention.

With reference now to FIG. 6, a routine 600 implemented by a network application, such as electronic mail interface computing device 208, for processing a mobile device registration request will be described. At block 602, the electronic mail interface computing device 208 obtains the mobile device registration request that includes a time out interval. At block 604, the electronic mail interface computing device 208 registers the mobile device 202 for the requested data. In an illustrative embodiment of the present invention, the registration can correspond to communication with any appropriate local network components, such as an electronic mail server, to allow the electronic mail interface computing device 208 to receive notification of new data. Additionally, the registration can correspond to the calculation of a time out interval if the registration request included criteria for calculating an appropriate time out interval. In the event that the registration request corresponds to multiple data change requests, the electronic mail interface computing device 208 can maintain a table for tracking criteria for forwarding the mobile client 202 information.

At block 606, the electronic mail interface computing device 208 begins a time out interval clock that measures the time elapsed since the receipt/processing of the registration request. In an illustrative embodiment of the present invention, the time out interval clock can correspond to an internal counting device that measures a time elapsed since the receipt of the registration request. Alternatively, the time out clock can correspond to a recordation of a time of day that the registration request was received for comparison with standard time of day measurements by the electronic mail interface computing device 208. One skilled in the relevant art will appreciate that any number of additional methodologies may be utilized to calculate, or otherwise track, a time elapsed since the receipt/processing of a registration request.

At decision block 608, a test is conducted to determine whether the electronic mail interface computing device 208 has received a notification of data change. In an illustrative embodiment of the present invention, the notification of data change can correspond to receipt of a new mail notification from an electronic mail server. Additionally, the notification of data change can correspond to a notification that a particular data file has been modified, accessed, etc. If a data change notification is received, at block 610, the electronic mail interface computing device 208 transmits a data change notification to the mobile device 202. In an illustrative embodiment of the present invention, the data change notification can include a generic message instructing the mobile device 202 to transmit a data request to the electronic mail interface computing device 208. Additionally, the data change notification can include various meta data or descriptive information that allows the mobile device 202 to select whether the device will transmit a subsequent data request. For example, the notification can include electronic mail message header information that allows the user to preview at least a portion of the message to determine whether he or she would like the entire message retrieved. In another example, the notification can include specific criteria that allow the mobile device 202 to automatically determine whether to request the change data. At block 612, the routine 600 terminates until the next registration request is received by the electronic mail interface computing device 208.

If, at decision block 608, a notification that data has changed is not received, at decision block 614, a test is conducted to determine whether a time elapsed since the receipt/processing of the registration request exceeds the time out interval. If the time out interval has not been exceeded (e.g., expired), the routine 600 returns to decision block 608. If the time out interval has expired, at block 616, the electronic mail interface computing device 208 transmits an expired time out interval notification to the mobile device 202. In an illustrative embodiment of the present invention, the expired time out interval notification corresponds to a message that maintains the communication link and that will elicit a renewed registration request by the mobile device 202. Additionally, the expired time out interval notification can include additional information, such as network event information or network characteristic information (e.g., available bandwidth, network quality ratings, etc.) that be utilized to tune subsequent time out intervals. At block 618, the routine 600 terminates.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for facilitating communications between a mobile device and a network application, the method comprising:

transmitting a first request for change of data, wherein the request includes a registration request for new data that has arrived at an electronic mail interface, and wherein the request for change of data includes a first time out interval for returning a response, wherein the first time-out interval specifies a time in which the response is required;

determining an event corresponding to the first request for change of data;

generating a second time out interval for returning a response based upon the event corresponding to the first request for change of data, wherein generating the second time out interval for returning a response includes adjusting the first time out interval based upon receipt of a no data change notification or detecting a network specified time out event; and transmitting a second request for change of data, wherein the request for change of data includes the second time out interval for returning a response.

2. The method as recited in claim 1, wherein adjusting the first time out interval based upon receipt of a no data change notification includes adjusting the first time out interval according to specific criteria.

3. The method as recited in claim 2, wherein the specific criteria is selected from a group consisting of if the first time out interval was previously increased, the first time out interval corresponds to a minimum time out interval and the receipt of the no data change notification corresponds to a series of no data change notifications.

4. The method as recited in claim 2, wherein adjusting the first time out interval includes associating an adjustment constant to each criterion and adjusting the first time out interval according to which criterion was satisfied.

5. The method as recited in claim 1, wherein adjusting the first time out interval includes adjusting the first time out interval to a highest known time out interval value.

6. The method as recited in claim 1, wherein adjusting the first time out interval includes adjusting the first time out interval to a network minimum if a network specified time out event is detected.

7. The method as recited in claim 1, wherein adjusting the first time out interval includes adjusting the first time out interval to a previous value if a network specified time out event is detected.

8. The method as recited in claim 1, wherein adjusting the first time out interval includes adjusting the first time out interval to a highest known time out interval if a network specified time out event is detected.

9. A method for facilitating communications between a mobile device and a network application, the method comprising:
   transmitting a first request for change of data, wherein the first request includes a registration request for new data that has arrived at an electronic mail interface, and wherein the request for change of data includes a first time out interval for returning a response, wherein the first time out interval specifies a time in which the response is required;
   determining an event corresponding to the first request for change of data;
   associating a set of adjustment criteria to the event corresponding to the first request for change of data;
   generating a second time out interval for returning a response, wherein generating the second time out interval for returning a response includes adjusting the first time out interval by applying a time constant from the set of adjustment criteria; and
   transmitting a second request for change of data, wherein the request for change of data includes the second time out interval for returning a response.

10. The method as recited in claim 9, wherein the adjustment criteria is selected from a group consisting of whether the first time out interval was previously increased, whether the first time out interval corresponds to a minimum time out interval, whether the receipt of the no data change notification corresponds to a series of no data change notifications, and whether a network specified time out is detected.

11. The method as recited in claim 10, wherein adjusting the first time out interval by applying a time constant from the set of adjustment criteria includes adjusting the first time out interval by a same time constant regardless of which adjustment criterion is satisfied.

12. The method as recited in claim 10, wherein adjusting the first time out interval by applying a time constant from the set of adjustment criteria includes adjusting the first time out interval by a different time constant corresponding to which adjustment criterion is satisfied.

13. The method as recited in claim 9, wherein adjusting the first time out interval by applying a time constant from the set of adjustment criteria includes adjusting the first time out interval to a highest known time out interval value if a no data change notification is received.

14. The method as recited in claim 9, wherein adjusting the first time out interval includes adjusting the first time out interval to a network minimum if a network specified time out event is detected.

15. The method as recited in claim 9, wherein adjusting the first time out interval includes adjusting the first time out interval to a previous value if a network specified time out event is detected.

16. The method as recited in claim 1, wherein adjusting the first time out interval includes adjusting the first time out interval to a highest known time out interval if a network specified time out event is detected.

17. A computer-readable medium having computer-executable components for facilitating communications between a mobile device and a network application, the computer-executable components comprising:
   a communication component for transmitting data requests for change of data to the network application and for receiving events corresponding to previous requests for change data, wherein the requests include a registration request for new data that has arrived at an electronic mail interface, and wherein the requests for change of data include a time out interval for providing a response, wherein the time out interval specifies a time in which the response is required; and
   a processing component for generating time out intervals for returning a response based upon the event corresponding to previous requests for change of data, wherein the processing component generates the time out intervals for returning a response by applying a set of adjustment criteria to the events corresponding to previous requests for change of data received by the communication component.

18. The computer-readable components as recited in claim 17, wherein the set of adjustment criteria is selected from a group consisting of whether the first time out interval was previously increased, whether the first time out interval corresponds to a minimum time out interval, whether the receipt of the no data change notification corresponds to a series of no data change notifications, and whether a network specified time out is detected.

19. The computer-readable components as recited in claim 17, wherein the set of adjustment criteria is selected from a group consisting of whether the first time out interval was previously increased, whether the first time out interval corresponds to a minimum time out interval and whether the receipt of the no data change notification corresponds to a series of no data change notifications.

20. The computer-readable components as recited in claim 17, wherein the processing component applies a time constant corresponding to which criterion is satisfied.

* * * * *